US005450269A

United States Patent [19]

Hsieh

[11] Patent Number: 5,450,269

[45] Date of Patent: Sep. 12, 1995

[54] GROUNDING ARRANGEMENT FOR A PROTECTOR IN TELECOMMUNICATIONS

[76] Inventor: Kin L. Hsieh, No. 9, Alley 17, Lane 26, Jihhsin St., Tu Cheng Hsiang, Taipei Hsien, Taiwan

[21] Appl. No.: 122,927

[22] Filed: Sep. 17, 1993

[51] Int. Cl.[6] .................................... H02H 3/22

[52] U.S. Cl. .................................... 361/119; 361/56; 361/91; 361/124

[58] Field of Search .............. 361/119, 118, 124, 120, 361/91, 56

[56] References Cited

U.S. PATENT DOCUMENTS 4,086,648 4/1978 Hines et al. ........................ 361/124

*Primary Examiner*—Marc S. Hoff
*Assistant Examiner*—S. Jackson
*Attorney, Agent, or Firm*—Ware, Fressola, Van Der Sluys & Adolphson

[57] ABSTRACT

A grounding arrangement for a protector includes an arrester device having two conducting points for connecting to inlet prongs and a grounding point having a protruding rod for connecting to a grounding prong, an arrester holder for receiving the arrester device and having two longitudinal extension portions for connecting with the two conducting points, and a tin bit provided for electrically connecting the holder and the grounding point of the arrester device and isolating the holder and two conducting point of the arrester device.

4 Claims, 4 Drawing Sheets

GROUNDING ARRANGEMENT FOR A PROTECTOR IN TELECOMMUNICATIONS

BACKGROUND OF THE INVENTION

The present invention relates to a protector for use in telecommunications and, more particularly, to an improved grounding arrangement for a protector which provides a more reliable grounding.

Protectors for use in telecommunications are provided in user ends, main distributing frames, arrester frames or cable distributing boxes. It is known there are three types of protectors for use in telecommunication system, i.e., lightning arresters, fuses, and thermal coils. The lightning arresters may protect the switching networks from high-voltage damage due to abnormally high voltage and current that can result from lightning strikes. The abnormal high-voltage pulses induced by lightning strikes are introduced into the discharge device in the arrester as to ground the inlet prongs thereby protecting the switching networks from the high-voltage pulses damage. It is known that there are six prongs provided in the base portion of a protector in the telecommunication industry. They are two inlet prongs for receiving electrical signals from a transmission source, one warning prong for sending a warning signal when the protector is struck by lightning, two outlet prongs for passing electrical signals to a receiving end, and one grounding prong for grounding the high-voltage pulses when the protector is struck by lightning.

A cross-sectional view of a conventional lightning arrester 20 is shown in FIG. 5. Shown in the base portion 24 are two inlet prongs 201, 202 in solid lines and two outlet prongs 203, 204 in phantom lines being respectively arranged behind prongs 201, 202. A warning prong 206 and a grounding prong 205 are respectively provided between the inlet prongs 201 and 202 and the outlet prongs 203 and 204. Two conducting plates 21*a*, 21*b* each has a bent portion to define a higher portion and a lower portion. The conducting plates 21*a*, 21*b* have the end in the lower portion secured on the base 24 for the higher portion to clamp an arrester device 25 e.g., a carbon arrester, via a pair of tin bits 26*a*, 26*b*. An arrester holder 250 is provided for clamping the arrester device 25 and electrically coupling the ground portion of the arrester device 25. The arrester holder 250 is directly connected to the grounding prong 205. The lower portions of the conducting plates 21*a*, 21*b* are electrically coupled respectively to the outlet prongs 203, 204, via two thermistors 29*a*, 29*b*, and are respectively clamped by two contact springs 22*a*, 22*b*, which having one end secured on the base portion 24 of the protector 20. The interconnection between the inlet prongs and the outlet prongs is thus formed. When the protector is in normal state, i.e., the protector is not struck by the lightning, the electrical signals received by the inlet prongs 201, 202 will pass to the outlet prongs 203, 204 via thermistors 29*a*, 29*b*. When high-voltage pulses due to lightning strikes are induced on one inlet prong, e.g. inlet 201, high-voltage pulses flow to the arrester device 25 via tin bit 26*a*, which in turn causes the arrester device 25 to discharge. The tin bit 26*a* will start to melt due to the heat generated by the discharge effect. Thus, the conducting plates 21*a* will move toward the arrester device 25 and the conducting plate 21*a* will contact the arrester holder 250. Thus, the high-voltage pulses induced by lightning strikes will be grounded via the grounding prong 205. A T-shape conducting plate 23 connected to an indicating lamp 27 via an electrical line 28 is placed between the other ends of the conducting plate 21*a*, 21*b*. As the conducting plate 21*a* moves toward the arrester device 25, the conducting plate 21*a* will contact the wing portion 230*a* of the T-shape conducting plate 23. Thus, the indicating lamp 27 will be illuminated to indicate that the protector 20 has been struck by lightning and has to be replaced. The indicating lamp 27 is further serially connected to the warning prong 205 so as to send a warning signal to other apparatus. When the inlet prong 202 is struck by lightning, the operative movement is similar to above description and is therefore not detailed here again.

Accordingly, there is only one inlet prong of a conventional protector grounded when one inlet prong is struck by lightning. While the other inlet prong is not grounded, thus the grounding of such conventional protector is not sufficient.

SUMMARY OF THE INVENTION

To overcome this disadvantages of the conventional protector, the present invention is proposed, which has a unique arrester holder mechanism for simultaneously grounding two inlet prongs thereof when any one of the inlet prongs is struck by lightning.

The present invention comprises a pole protruding from the grounding portion of the arrester device, a tin bit with a hole for the protruding pole to pass through and an arrester holder for clamping the arrester device and having two longitudinal extension portions for contacting with the contact points of the arrester device when lightning strikes. The tin bit is inserted between the arrester holder and the grounding portion of the arrester device. As either of the inlet prongs is struck by lightning, the tin bit therebetween melts and the two extension portions of the arrester holder move toward the contact points of the arrester device. Therefore, the extension portions of the arrester holder simultaneously contact the conducting points of the arrester device thereby providing an effective grounding arrangement of a protector.

Other objects, advantages, and novel features of the invention will become more apparent from the following detailed description when taken in conjunction with the accompanying drawings.

In the figures, like reference numerals are used to refer to like elements throughout.

DETAILED DESCRIPTION OF THE PREFERRED EMBODIMENTS

Figure 1:
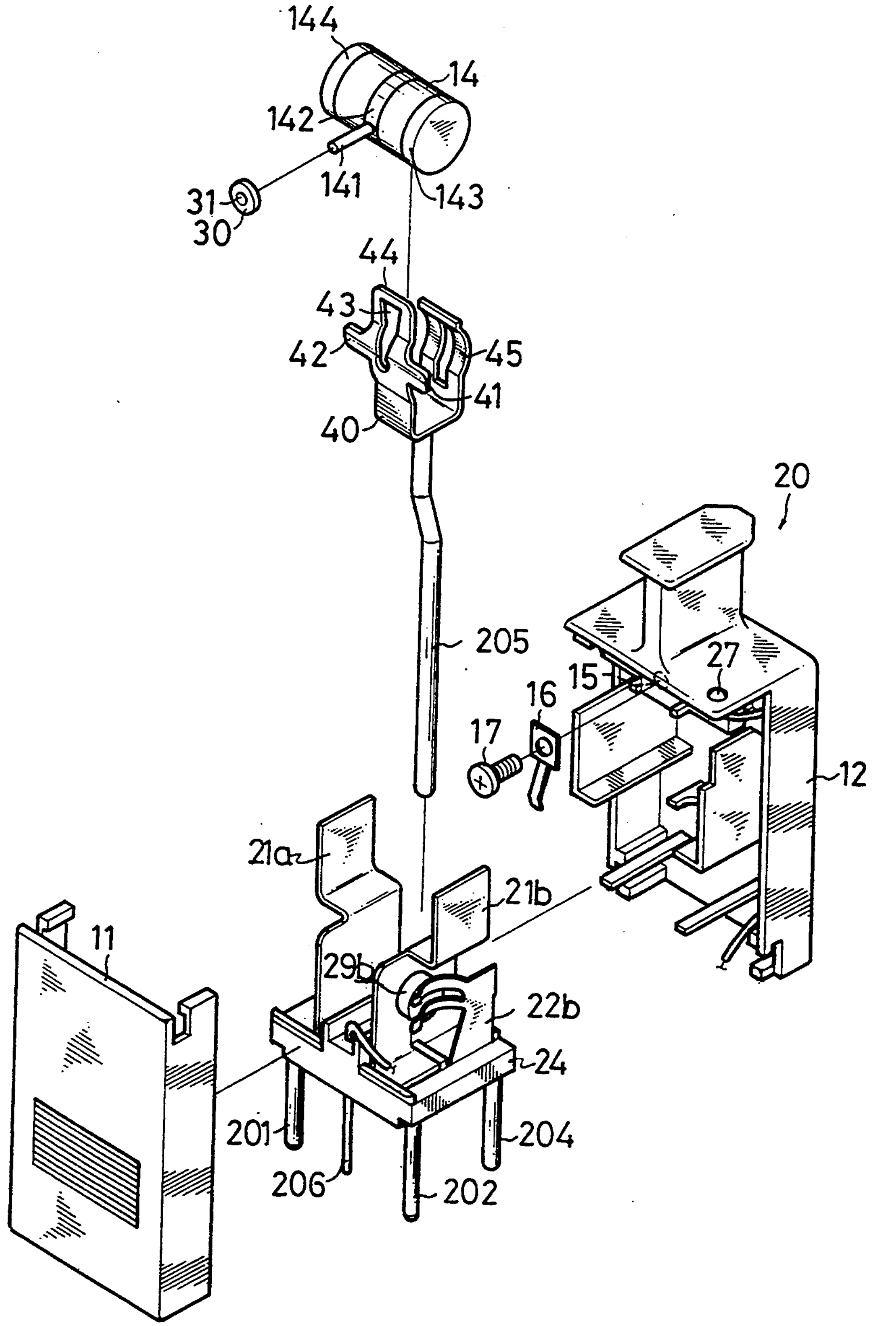
FIG. 1 is a perspective exploded view of an embodiment of the protector of the present invention.

Referring to the drawings and initially to FIG. 1, a protector 20 in accordance with the present invention generally includes a housing portion and an electrical portion.

The housing portion consists of a housing cover 11 and a housing body 12 which cooperate to define the electrical portion having a plurality of components.

Figure 5:
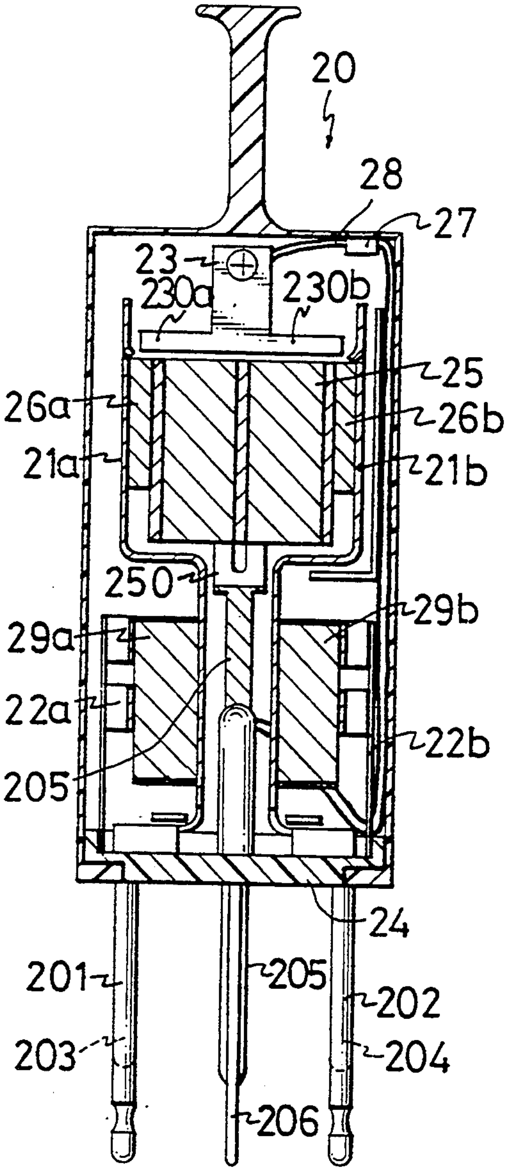
FIG. 5 PRIOR ART
FIG. 5 is a cross sectional view of a conventional protector.

Shown in FIG. 1, the components comprise two inlet prongs 201, 202, two outlet prongs 203, 204, a warning prong 206, a grounding prong 205, two conducting plates 21*a*, 21*b*, two thermistors 29*a*, 29*b* (one of the thermistors 29*a* is not shown), and two contact plates 22*a*, 22*b*, which are identical to the corresponding components in configuration and functions as shown in FIG. 5.

The components further comprise a screw 17 to be received within a hole of a tongue 16 and a hole 15 of the body 12 to connect the tongue 16 to the body 12 and electrically connect to an indicating lamp 13 and the warning prong 206. The components still further comprise an arrester holder 40, an arrester device 14 and a tin bit 30. The grounding prong 205 passes through a base 24 of the protector 20 and connects to the arrester holder 40 for grounding the high-voltage pulses come from the inlet prongs. The arrester holder 40 has two clip ends 44 and 45 for clamping the arrester device 14 and two longitudinal extension portions 41 and 42 for contacting the contact points 143, 144 of the arrester device 14 when any one of inlet prongs is struck by lightning. A rod 141 protrudes from a grounding portion 142 of the arrester device 14 for passing through a hole 31 within the tin bit 30. An opening 43 is provided on the clip end 44 of the holder 40 for the rod 141 to pass through when the arrester 14 is held by the arrester holder 40.

Figure 2:
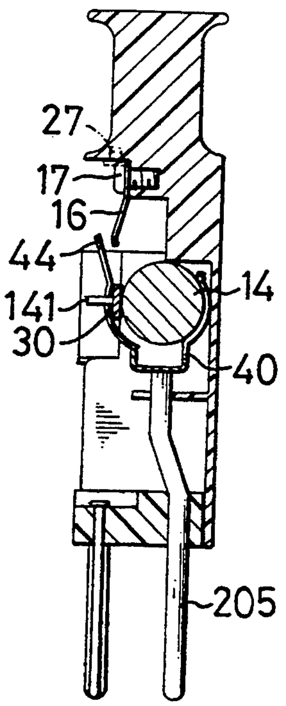
FIG. 2 is a cross-sectional view of the protector of FIG. 1 in an assembled state, wherein the tin bit is placed between the arrester holder and the arrester device.
Figure 3:
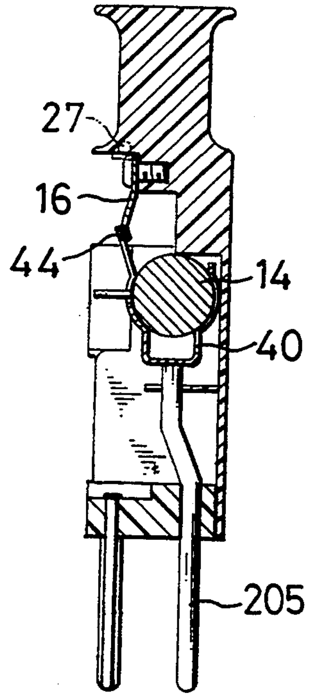
FIG. 3 is a cross-sectional view of the protector of FIG. 1 showing the tin bit has melted.

As shown in FIG. 2, the arrester device 14 and the tin bit 30 have been received by the arrester holder 40. Due to the insertion of the tin bit 30 between the holder 40 and the arrester device 14, the clip end 44 of the holder 40 is separated from the tongue 16. As shown in FIGS. 1 and 3, as the inlet prong 201 is struck by lightning, high-voltage pulses will pass through the conducting plate 21*a* and reach conducting point 144 of arrester device 14. Thus, the tin bit 30 inserted between the arrester device 14 and the arrester holder 40 melts due to the heat generated by discharge effect so that the clip end 44 of the holder 40 will move toward the tongue 16 and electrically connect to the tongue 16 to illuminate the indicating lamp 13 and send a signal to the warning prong 206. Meanwhile, two extension portions 41, 42 of the arrester holder 40 will simultaneously connect to the conducting points 143, 144 of the arrester device 14. Thus, both of the inlet prongs 121 are grounded thereby the grounding of the protector is improved.

Figure 4:
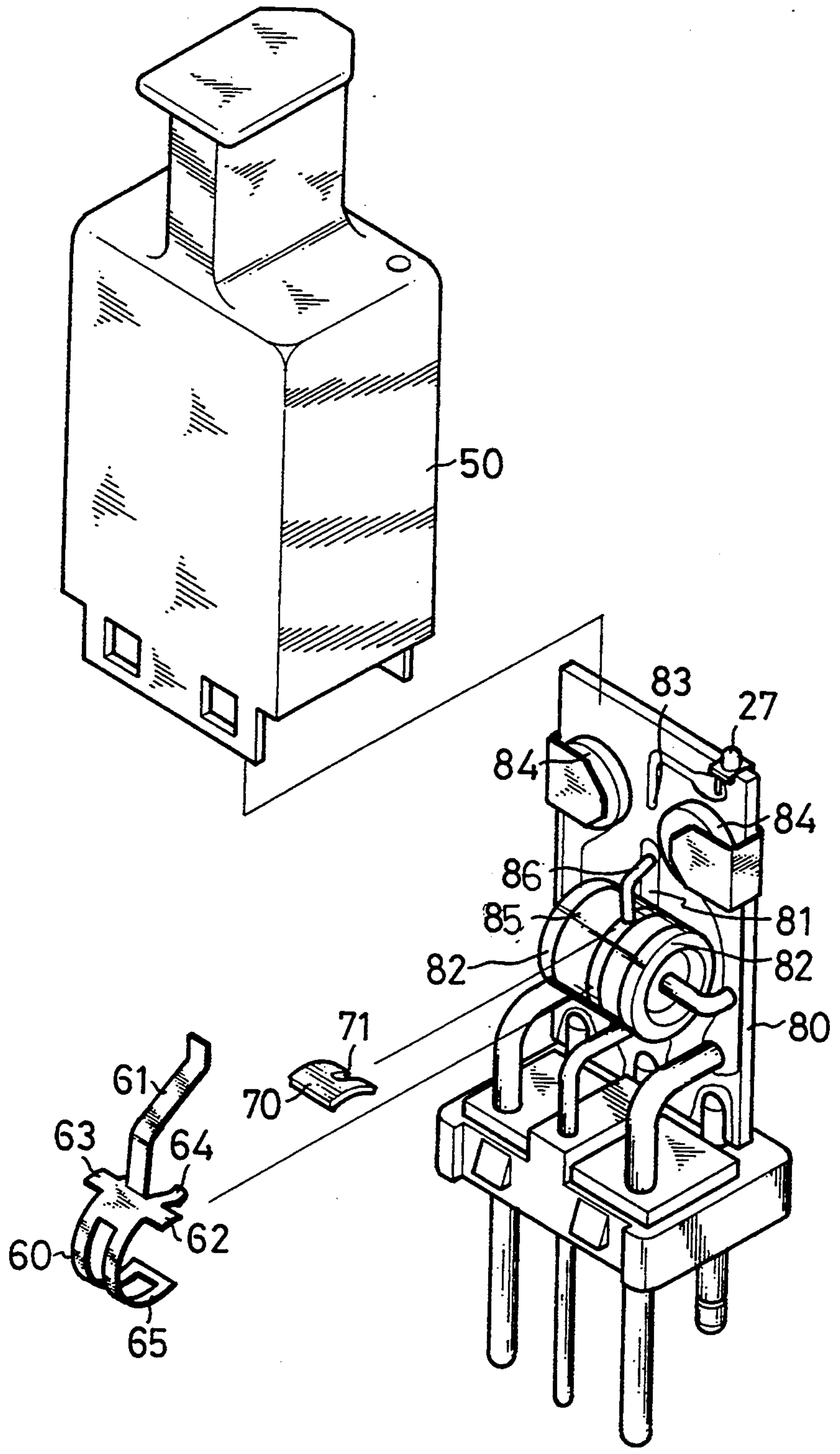
FIG. 4 is a perspective exploded view of another embodiment of the protector of the present invention.

Another embodiment of this invention is shown in FIG. 4, the electrical portion is covered with a housing 50. The components of the electrical portion are attached to a printed circuit board 80. The inlet prongs, outlet prongs, grounding prong and warning prong are similar to the corresponding components shown in FIG. 1 in configuration and functions, and are therefore not detailed here for the sake of brevity.

Two conducting leads 87 of the arrester device 85 are respectively provided to electrically connect to the inlet prongs. Two conducting clamps 90 are provided to secure the corresponding thermistors 84 for electrically connecting the inlet prongs to the outlet prongs. The grounding portion of the arrester device 85 has a protruding elbow 86 to connect with the grounding prong. A tin bit 70 having a notch 71 is provided to be fitted with the protruding elbow 86 and abutted against the arrester device 85. An arrester clamp 60 has a clip end 65 electrically connected to the grounding prong and the other end of the clamp 60 has two longitudinal extension portions 62, 63, two nubs 64 covering the tin bit 70 and a tongue portion 61 having a tip extending on a pad portion 83, which electrically connects to an indicating lamp 27 and the warning prong. The length between the tips of longitudinal extension portions 62, 63 is equal to the length of the arrester device 85 as to contact the contact points 82 of the arrester device 85. As one inlet prong of the protector is struck by lightning, high-voltage pulses cause the arrester device 85 to discharge so that the tin bit 70 melts due to the heat generated by the discharge effect. Then, the longitudinal extension portions 62 will simultaneously contact said two contact points 82 of the arrester device 85 thereby grounding the inlet prongs. Meanwhile, the tongue portion 61 of the clamp 60 simultaneously contacts the pad portion 83 as to illuminate the lamp 82 and send a warning signal to the warning prong.

Although the invention has been explained in relation to its preferred embodiment, it is to be understood that many other possible modifications and variations can be made without departing from the spirit and scope of the invention as hereinafter claimed.

I claim:

1. A grounding arrangement for a protector, comprising:

two inlet prongs for receiving electrical signals;

two outlet prongs for passing electrical signals;

a grounding prong for grounding high-voltage pulses induced by lightning strikes;

an arrester device having two contact points for coupling with the inlet prongs and one grounding point for coupling with the grounding prong;

an arrester holder electrically connecting to the grounding prong and clamping the arrester device having two longitudinal extension portions sized to simultaneously contact two contact points of the arrester device;

a tin bit being inserted between the arrester holder and the grounding point of the arrester device for providing the electrical connection therebetween and isolating the arrester holder from the contact points of the arrester device, so that when the tin bit melts due to the heat generated from the discharging effect, the two extensions of the arrester holder will couple two contact points of the arrester device thereby simultaneously grounding the inlet prongs;

an indicating lamp for indicating that the protector has been struck by lightning;

a warning prong connecting to the indicating lamp for delivering an electrical signal; and a tongue portion electrically connectable to the indicating lamp and the warning prong.

2. A grounding arrangement as claim in claim 1, wherein said arrester holder further comprises a clip end electrically connectable to the tongue portion when the arrester device discharges due to the lightning strikes.

3. A grounding arrangement as claimed in claim 1, wherein the arrester device has a rod protruding from the grounding point of the arrester device and wherein the tin bit is provided with a hole for the rod to pass through and secure the tin bit on the arrester device.

4. A grounding arrangement as claimed in claim 1, wherein the arrester device has an elbow rod protruding from the grounding point of the arrester device and wherein the tin bit is provided with a notch for the elbow to fit within the notch thereby securing the tin bit on the arrester device.

* * * * *